(12) United States Patent
Goto et al.

(10) Patent No.: US 6,962,226 B2
(45) Date of Patent: Nov. 8, 2005

(54) VEHICULAR TWO-WHEEL DRIVE AND FOUR-WHEEL DRIVE SWITCHING SYSTEM

(75) Inventors: Shinji Goto, Saitama (JP); Takeshi Nakazawa, Saitama (JP); Hiroaki Iguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 161 days.

(21) Appl. No.: 10/062,536

(22) Filed: Feb. 5, 2002

(65) Prior Publication Data

US 2002/0104703 A1 Aug. 8, 2002

(30) Foreign Application Priority Data

Feb. 5, 2001 (JP) ............................. 2001-027955
Feb. 15, 2001 (JP) ............................. 2001-038680

(51) Int. Cl.⁷ .......................................... B60K 17/34
(52) U.S. Cl. .................. 180/233; 180/247; 192/103 R; 701/69
(58) Field of Search ................ 180/233, 247, 180/248, 249, 250, 244; 701/89, 67, 69; 192/35, 192/103 R

(56) References Cited

U.S. PATENT DOCUMENTS

| | | | | |
|---|---|---|---|---|
| 3,300,002 A | * | 1/1967 | Roper ......................... | 192/35 |
| 4,937,750 A | * | 6/1990 | Gilliam ....................... | 701/69 |
| 5,620,072 A | * | 4/1997 | Engle .......................... | 192/35 |
| 5,839,084 A | * | 11/1998 | Takasaki et al. .............. | 701/67 |
| 6,123,183 A | * | 9/2000 | Ito et al. ..................... | 192/220 |
| 2001/0002629 A1 | * | 6/2001 | Arai et al. ................... | 180/233 |
| 2001/0042652 A1 | * | 11/2001 | Watson et al. .............. | 180/249 |
| 2002/0144851 A1 | * | 10/2002 | Porter ......................... | 180/247 |

FOREIGN PATENT DOCUMENTS

| | | | |
|---|---|---|---|
| JP | 62-25223 U | | 2/1987 |
| JP | 1-175528 | * | 7/1989 |
| JP | 8-216714 A | | 8/1996 |

* cited by examiner

*Primary Examiner*—Anne Marie Boehler
(74) *Attorney, Agent, or Firm*—Birch, Stewart, Kolasch & Birch, LLP

(57) ABSTRACT

To provide a vehicular two-wheel drive and four-wheel drive switching system the power consumption of which can be reduced. A vehicular two-wheel drive and four-wheel drive switching system is provided with a switching unit for transmitting power or disconnecting the transmission of power. The switching unit is provided with a driving shaft connected to the drive side, a driven shaft fitted to the driving shaft via an annular clearance gap. A plurality of connecting/disconnecting members are provided in a clearance between the driving shaft and the driven shaft for connecting or disconnecting the driving shaft and the driven shaft by being fitted or disconnected to/from respective opposite surfaces. A switching mechanism is provided for selectively positioning the connecting/disconnecting members in a position in which the driving shaft and the driven shaft are connected and in a position in which the driving shaft and driven shaft are disconnected. A control unit is provided for supplying driving current to the switching mechanism by repeating continuous supply and supply by duty cycle control.

10 Claims, 10 Drawing Sheets

ELECTROMAGNETIC CLUTCH OFF

ELECTROMAGNETIC CLUTCH ON

VEHICULAR TWO-WHEEL DRIVE AND FOUR-WHEEL DRIVE SWITCHING SYSTEM

CROSS-REFERENCE TO RELATED APPLICATIONS

The present application claims priority under 35 USC 119 to Japanese Patent Application No. 2001-027955 filed on Feb. 5, 2001 and Japanese Patent Application No. 2001-038680 filed on Feb. 15, 2001 the entire contents thereof is hereby incorporated by reference.

BACKGROUND OF THE INVENTION

1. Field of the Invention

The present invention relates to a vehicular two-wheel drive and four-wheel drive switching system.

2. Description of Background Art

Heretofore, a vehicle wherein two-wheel drive can be switched to four-wheel drive is known.

FIGS. 4 and 5 show an example of the above-mentioned vehicle 1 that includes a body frame 3 in the center of which an engine 2 is mounted, a front wheel 4 and a rear wheel 5 are arranged on both sides of the front and the rear of the body frame 3. A steering handlebar 6 is arranged above the front of the body frame 3 for steering the front wheel 4. A fuel tank 7 is located above the engine 2 and attached to the body frame 3. A seat 8 is attached to the rear of the fuel tank 7.

As shown in FIG. 5, each front wheel 4 is supported by a suspension system 9 provided on both sides of the front of the body frame 3 so that each front wheel can be vertically moved. Each rear wheel 5 is supported by a suspension system 10 provided on both sides of the rear of the body frame 3 so that each rear wheel can be vertically moved.

A final reduction gear for front wheels 13 and a final reduction gear for rear wheels 14, respectively, connected to the engine 2 via propeller shafts 11 and 12 and are provided in the center of the front and the center of the rear, respectively, of the body frame 3. The right and left front wheels 4 and the right and left rear wheels 5 are respectively connected to the final reduction gear for the front wheels 13 and the final reduction gear for the rear wheels 14.

A two-wheel drive and four-wheel drive switching system for switching a type of rear-wheel drive and a type of four-wheel drive by disconnecting motive power to be transmitted to the front wheels 4 or transmitting motive power to the front wheels 4 is provided between the final reduction gear for the front wheels 13 and the propeller shaft 11 for example.

In the alternative, the two-wheel drive and four-wheel drive switching system is provided between the rear propeller shaft 12 and the final reduction gear for the rear wheels 14, and the type of front-wheel drive and the type of four-wheel drive may be also switched.

The switching of the types of drive is suitably performed by a driver according to the state of a road surface and the type of traveling.

For example, a two-wheel drive and four-wheel drive switching system having structure shown in FIG. 7 is proposed.

The drive type is switched according to the state of the road surface or the type of running or the running type of the vehicle in case a difference in revolution between a front wheel and a rear wheel is equal to or greater than a set value.

For example, a two-wheel drive and four-wheel drive switching system having structure shown in FIG. 7 is proposed.

The two-wheel drive and four-wheel drive switching system denoted by a reference number 15 in FIG. 7 is composed of two input shaft components 16a and 16b formed by axially dividing the input shaft 16 of the final reduction gear for the front wheels 13 into two and matched on the same axis and a switching unit 17 for connecting or disconnecting the shafts.

To describe in detail, a cylindrical positioning protrusion 18 is provided in the center of the end face of the input shaft component 16a located on the side of the final reduction gear for the front wheels 13. A positioning concave portion 19 into which the positioning protrusion 18 is fitted so that the positioning protrusion can be turned is formed in the center of the end face of the input shaft component 16b located outside. Both input shaft components 16a and 16b are positioned on the same axis and are connected so that they can be relatively turned by matching both input shaft components 16a and 16b so that the positioning protrusion 18 and the positioning concave portion 19 are fitted.

Splines S1 and S2 are formed on the respective peripheral faces of the respective matched parts of both input shaft components 16a and 16b and the switching unit 17 is provided so that it surrounds these matched parts.

This switching unit 17 is composed by a switching ring 20 on the inner surface of which a spline is formed, which is fitted to the respective matched parts of both input shaft components 16a and 16b so that the switching ring can be slid and the spline of which is engaged with or is disengaged from the respective splines S1 and S2 and a drive mechanism 21 formed by a solenoid for selectively moving the switching ring 20 to a position in which the spline is engaged with only one input shaft component 16a or a position in which the spline is simultaneously engaged with the splines S1 and S2 of both input shaft components 16a and 16b by sliding the switching ring 20 in the axial direction of both input shaft components 16a and 16b.

The two-wheel drive and four-wheel drive switching system 15 configured as described above is turned to a two-wheel drive in which only the rear wheels are driven by moving the switching ring 20 in one direction by the drive mechanism 21, engaging it with only one input shaft component 16a and disconnecting the transmission of driving force to the front wheels 4. The switching system 15 is turned to a four-wheel drive in which driving force is transmitted to the front wheels 4 and the front wheels 4 and the rear wheels 5 are simultaneously driven by engaging the switching ring 20 with the other input shaft component 16b in a state in which the switching ring is engaged with one input shaft component 16a by sliding the switching ring 20 and hereby, connecting both input shaft components 16a and 16b.

As disclosed in Japanese published unexamined patent application No. Hei 8-216714, in four-wheel drive, the two-wheel drive and four-wheel drive switching system 15 is kept a state in which driving current is supplied.

For a method of switching drive types, as disclosed in Japanese published unexamined utility model application No. Sho 62-25223 for example, when a difference in the revolutions between the front wheels and the rear wheels is equal to or greater than a preset predetermined value, a state of four-wheel drive is held to enhance operating performance.

That is, as shown in FIG. 8, in two-wheel drive, the supply of driving current to the two-wheel drive and four-wheel drive switching system 15 is stopped and in four-wheel drive, driving current is continuously supplied to the two-wheel drive and four-wheel drive switching system.

However, such a conventional type two-wheel drive and four-wheel drive switching system 15 has the following problems that require improvement.

That is, there is a problem that when there is difference in peripheral speed between the front wheel 4 and the rear wheel 5 in switching drive types, engagement between the switching ring 20 and the input shaft component 16b does not function and switching may be disabled.

Even if switching is made, there is also a problem that the splines collide in switching which results in the production of noise.

To solve such problems, a mechanism for synchronizing (aligning) the spline of the switching ring 20 and the spline of the input shaft component 16b is required, the structure becomes complex and when the two-wheel drive and the four-wheel drive switching system 15 is built. A construction of the mechanism is greatly changed from the existing structure.

In the meantime, as disclosed in Japanese published unexamined patent application No. Hei 8-216714, as driving current is continuously supplied to the two-wheel drive and four-wheel drive switching system 15 in four-wheel drive, the power consumption is large and it imposes a large load on a compact vehicle.

In addition, in a technique disclosed in Japanese published unexamined utility model application No. Sho 62-25223, impact when the drive type is switched to a four-wheel drive type is transmitted to a rider.

As this impact is different according to the speed of a vehicle and the driving condition of the vehicle such as a difference between forward travel and reverse, it is desired that to reduce the possibility of the impact.

SUMMARY AND OBJECTS OF THE INVENTION

The invention is made to solve such conventional type problems and the object is to provide a vehicular two-wheel drive and four-wheel drive switching system the configuration of which is simple, which can be built without changing the existing configuration possibly, which hardly generates noise and in which impact when a drive type is switched to a four-wheel drive type based upon difference in revolution between a front wheel and a rear wheel can be inhibited. In addition, the present invention reduces the power consumption of the switching system.

A vehicular two-wheel drive and four-wheel drive switching system according to the present invention is provided with a switching unit provided on either side of power transmission mechanisms, respectively, provided between an engine and front wheels and between the engine and rear wheels for transmitting power in the power transmission mechanism or disconnecting the transmission of power so as to achieve the above-mentioned object. The switching unit is provided with a driving shaft connected to the drive side. A driven shaft is fitted to the driving shaft via a circular clearance gap. A plurality of connecting/disconnecting members are provided in the clearance between the driving shaft and the driven shaft for connecting or disconnecting the driving shaft and the driven shaft by being fitted or disconnected to/from the respective opposite surfaces. A switching mechanism is provided for selectively positioning the connecting/disconnecting members in a position in which the drive shaft and the driven shaft are connected and in a position in which the drive shaft and the driven shaft are disconnected. A control unit is provided for controlling the drive of the switching mechanism. The control unit supplies driving current to the switching mechanism by repeating continuous supply and supply by duty cycle control.

In addition, a vehicular two-wheel drive and four-wheel drive switching system is provided according to the present invention with a switching unit provided on either side of power transmission mechanisms, respectively, provided between an engine and front wheels and between the engine and rear wheels for transmitting power in the power transmission mechanism or disconnecting the transmission of power so as to achieve the above-mentioned object. The switching unit is provided with a driving shaft connected to the drive side. A driven shaft is fitted to the driving shaft via a circular clearance gap. A plurality of connecting/disconnecting members are provided in the clearance between the driving shaft and the driven shaft for connecting or disconnecting the driving shaft and the driven shaft by being fitted or disconnected to/from respective opposite surfaces. A switching mechanism is provided for switching a four-wheel drive type in which the driving shaft and the driven shaft are connected and a two-wheel drive type in which the driving shaft and the driven shaft are disconnected by operating the connecting/disconnecting members. A control unit is provided for controlling the drive of the switching mechanism and a transfer switch is operated by a rider for inputting a signal for switching the two-wheel drive type and the four-wheel drive type to the control unit. When a signal for switching to the four-wheel drive type is output from the transfer switch, the control unit holds the driving shaft and the driven shaft a state in which they are disconnected in case a difference in the revolutions between the front wheel and the rear wheel is equal to or greater than the one according to vehicle speed of a preset plurality of predetermined values and switches to a state in which the driving shaft and the driven shaft are connected in the case where the difference in revolution between the front wheel and the rear wheel is below a predetermined value according to vehicle speed of the preset plurality of predetermined values.

A vehicular two-wheel drive and four-wheel drive switching system according to the present invention is characterized in that the vehicle speed is classified into a plurality of regions and the predetermined value is set for every region of vehicle speed.

A vehicular two-wheel drive and four-wheel drive switching system according to the present invention is characterized in that the vehicle speed is detected using the rotational speed of the front wheel or the rear wheel as a parameter.

A vehicular two-wheel drive and four-wheel drive switching system according to the present invention is characterized in that the predetermined value is individually set in relation to the movement in a reverse direction of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to FIGS. 1 to 3 and 6, one embodiment of the invention will be described below.

Figure 4:
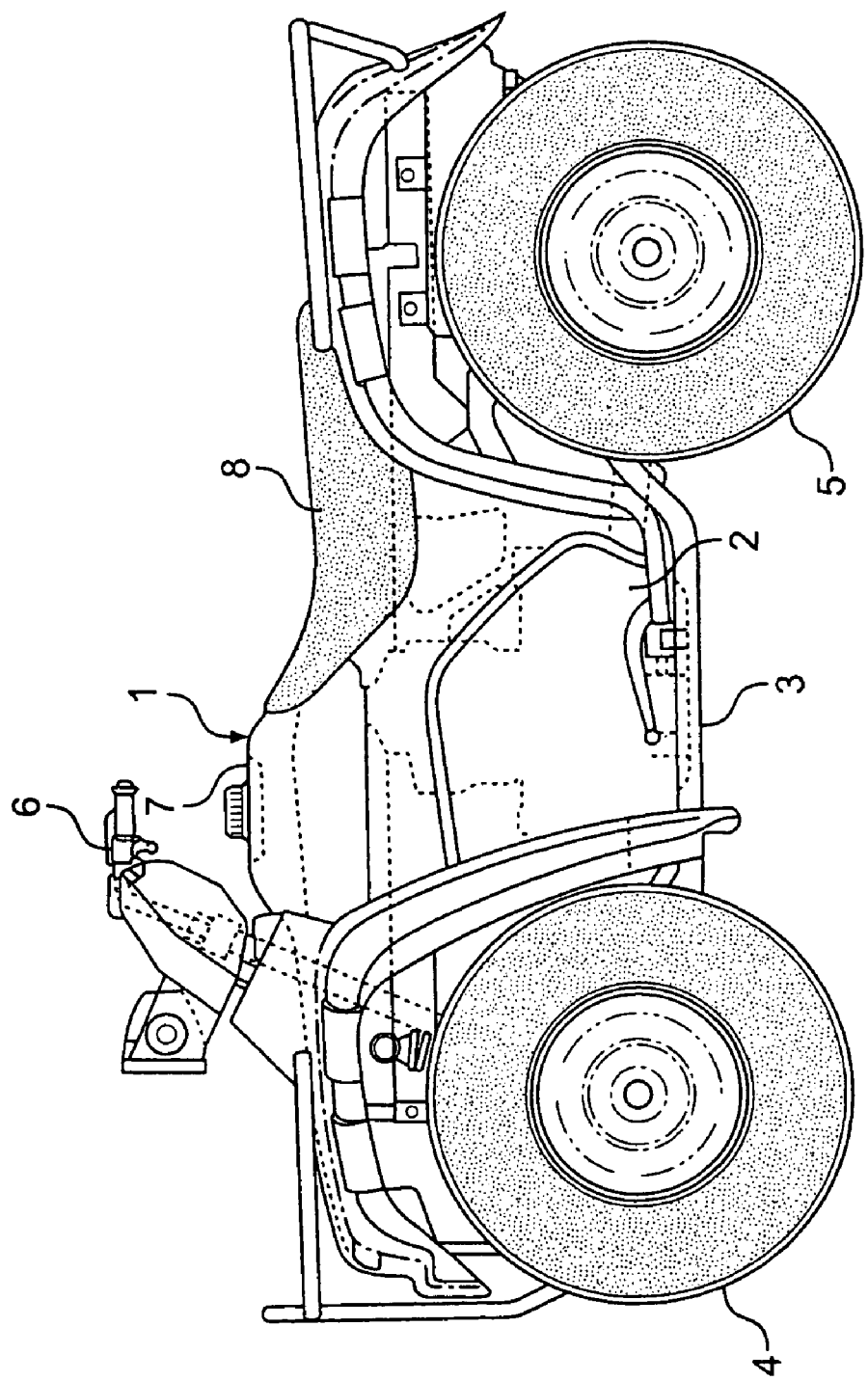
FIG. 4 is a side view showing an example of a vehicle provided with the two-wheel drive and four-wheel drive switching system.
Figure 5:
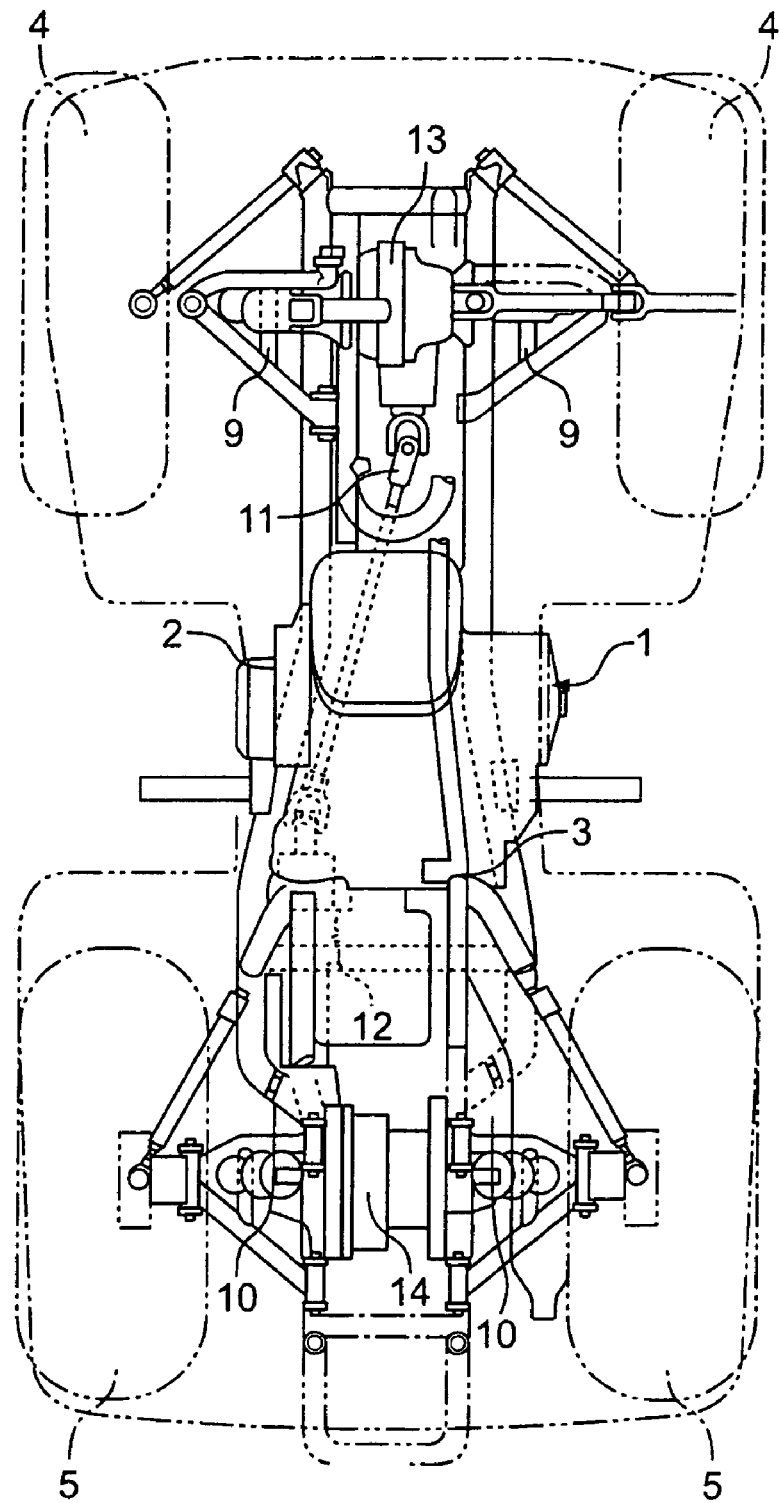
FIG. 5 is a plan for explaining the body configuration of the vehicle shown in FIG. 5.

As primary components of a vehicle are common to those in FIGS. 4 and 5 in the following description, the description is made using the same reference numbers and is simplified.

Figure 1:
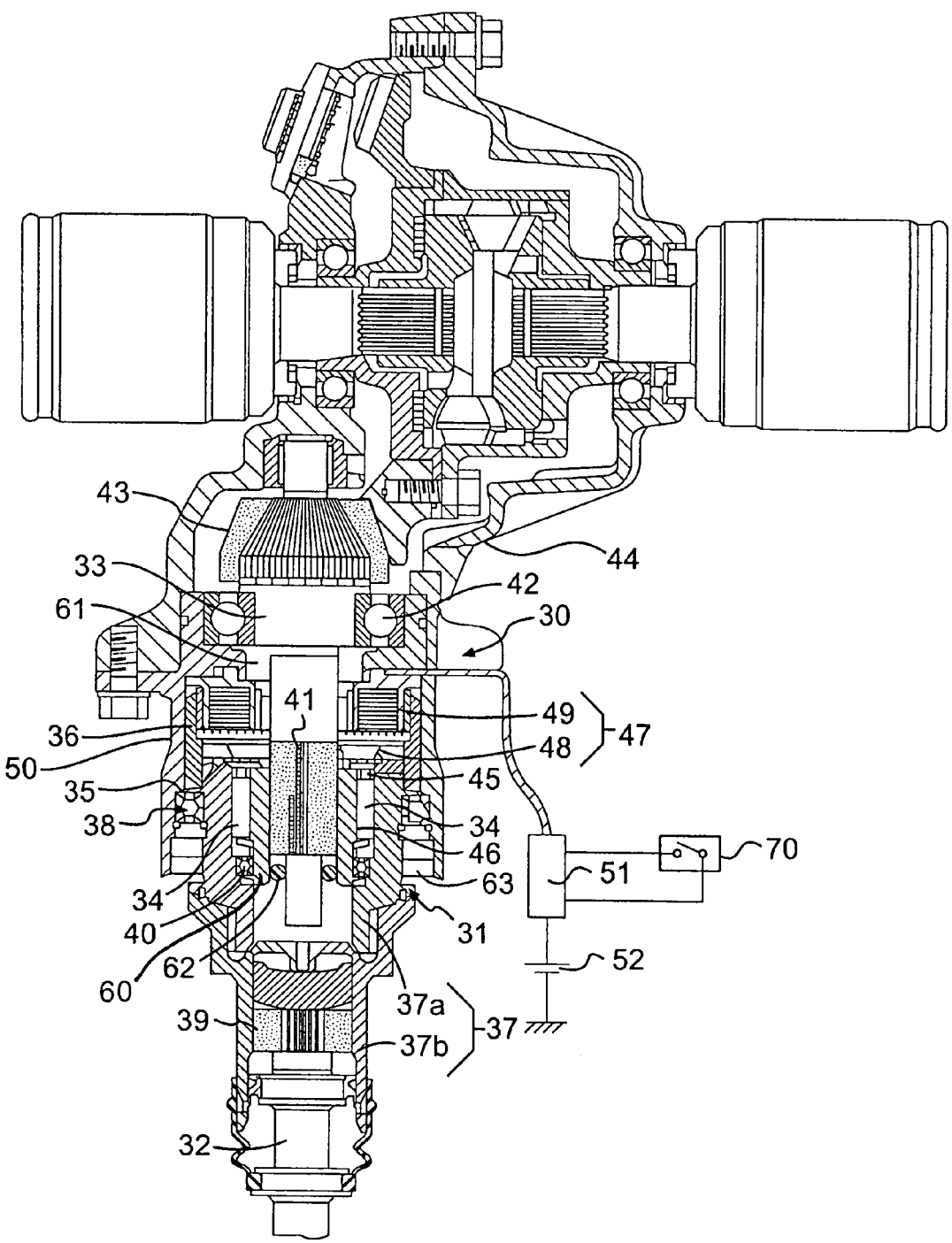
FIG. 1 is a sectional view showing one embodiment of the invention.

A two-wheel drive and four-wheel drive switching system (hereinafter called a drive switching system) equivalent to this embodiment and shown by a reference number 30 in FIG. 1 is provided in a power transmission device provided between front wheels 4 and an engine 2. A switching unit 31 is provided for transmitting power in the power transmission mechanism or disconnecting the transmission of power. The switching unit 31 is substantially composed of a driving shaft 32 connected to the drive side. A driven shaft 33 is fitted to the driving shaft 32 via a circular clearance gap. A plurality of connecting/disconnecting members 34 are provided in the clearance between these driving shaft 32 and driven shaft 33 for connecting or disconnecting the driving shaft 32 and driven shaft 33 by being connected or disconnected to/from these opposite faces. A switching mechanism 35 is provided for selectively positioning the connecting/disconnecting members 34 in a position in which the driving shaft 32 and the driven shaft 33 are connected and in a position in which they are disconnected and a casing 36 surrounding the switching mechanism 35.

Next, to describe the details of the elements, in this embodiment, a cylindrical outer ring 37 protruded on the side of the engine 2 and is provided via a bearing 38 in the casing 36 so that the outer ring can be turned.

This outer ring 37 is axially divided into two. A first outer ring 37a and a second outer ring 37b are provided wherein the first outer ring and the second outer ring are connected via a spline 60 provided at the respective ends so that they can be integrally turned.

A spline 39 is formed on the inner surface of the end on the side of the engine 2 of the second outer ring 37b, and the driving shaft 32 and the second outer ring 37b are connected by inserting the driving shaft 32 into the second outer ring 37b so that the driving shaft and the spline 39 are engaged.

A cylindrical inner ring 40 is arranged inside the outer ring 37 via a circular interval of predetermined width between the inner ring and the inner surface of the outer ring 37.

A spline 41 is formed on the inner surface of the inner ring 40 and the driven shaft 33 inserted in the casing 36 is connected to the inner ring 40 via the spline 41.

An intermediate part in the longitudinal direction of the driven shaft 33 is supported by a bearing 42 attached to the casing 36 so that the intermediate part can be turned.

A bevel gear 43 is integrated with the end of the driven shaft 33 and is engaged with a ring gear 44 of the final reduction gear for the front wheels 13.

Figure 2:
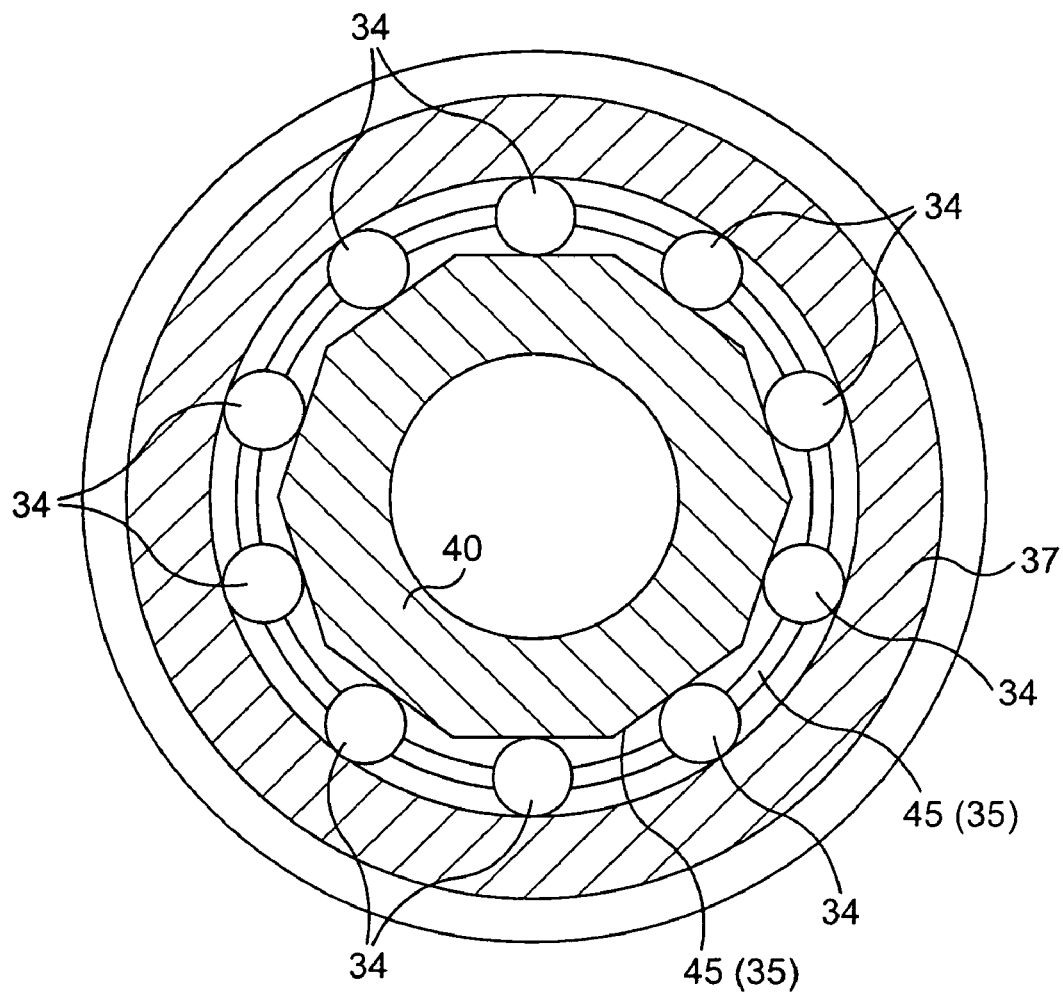
FIG. 2 is a longitudinal sectional view showing the main part.

The plurality of connecting/disconnecting members 34 forming a part of the switching unit 31 are respectively formed by plural rollers arranged in parallel with the axis of the outer ring 37. As shown in FIGS. 1 and 2 and the switching mechanism 35 is composed of a retainer 45 holding the connecting/disconnecting member 34 so that it can be turned and mounted on the outer ring 37 so that the retainer can be relatively turned (can be relatively moved around the axis). A cam 46 is formed on the surface of the inner ring 40 for moving the connecting/disconnecting member 34 in the direction of the diameter as the retainer 45 is relatively moved.

An electromagnetic clutch 47 forming the switching mechanism 35 for fixing or disconnecting the retainer 45 and the outer ring 37 is provided at the end located inside the casing 36 of the outer ring 37.

The electromagnetic clutch 47 is composed of a clutch plate 48 provided between the retainer 45 and the outer ring 37 and an electromagnetic coil 49 for pressing or disconnecting the clutch plate 48.

The transfer torque of this electromagnetic clutch 47 is adjusted depending upon the magnitude of applied current and hereby, the distribution of torque to the front wheel 4 and the rear wheel 5 is adjusted.

The electromagnetic coil 49 makes a connection by exciting the clutch plate 48 and hereby, the retainer 45 and the outer ring 37 are fixed so that they cannot be relatively turned.

The electromagnetic coil 49 is annular in shape and is housed in a housing 50 similarly formed in an annular shape and forming an iron core. The housing 50 is attached to the casing 36 by mounting the housing 50 on the casing 36 so that the housing surrounds the driven shaft 33.

The outer ring 37, the inner ring 40 and the switching mechanism 35 are built in the casing 36 and are united. As shown in FIG. 1, in a state in which the driven shaft 33 is mounted, the casing 36 is attached to the final reduction gear for the front wheels 13 by being bolted on the case of the final reduction gear for the front wheels 13.

A control unit 51 for controlling the turning the electromagnetic coil 49 on or off and a power source 52 for supplying the driving power of the electromagnetic coil 49 are connected to the electromagnetic coil 49.

Reference numbers 61 and 62 in FIG. 1 denote an oil seal and 63 denotes a dust seal.

Further, in this embodiment, as shown in FIG. 1, a transfer switch 70 that outputs a signal for switching a two-wheel drive type and a four-wheel drive type to the control unit 51 when a rider operates the transfer switch 70 is connected to the control unit 51.

In the meantime, when the transfer switch 70 is operated and a signal for switching to the four-wheel drive type is output, the control unit 51 holds the driving shaft 32 and the driven shaft 33 in a state in which they are disconnected in case a difference in the revolutions between the front wheel 4 and the rear wheel 5 is equal to or greater than the one according to vehicle speed (V) of preset plural predetermined values (Y). The control unit 51 switches to a state in which the driving shaft 32 and the driven shaft 33 are connected in a case wherein the difference in the revolutions between the front wheel 4 and the rear wheel 5 is below the one according to vehicle speed (V) of preset plural predetermined values (Y).

Figure 6:
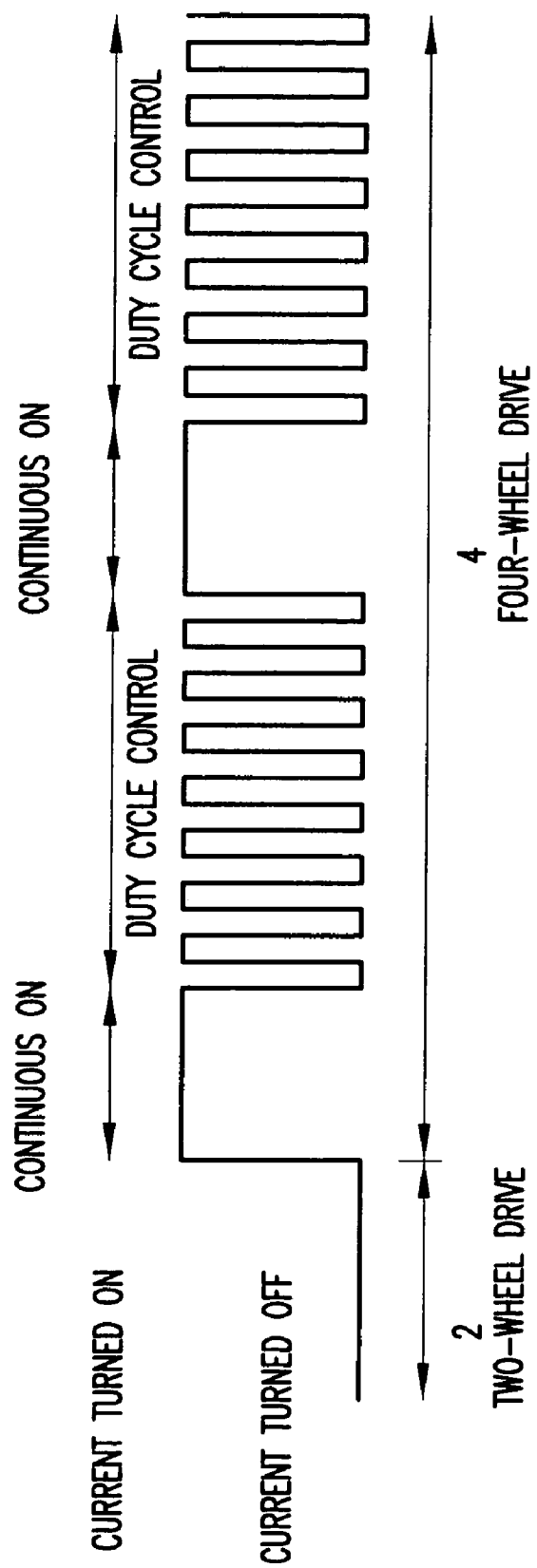
FIG. 6 illustrates a waveform of driving current supplied to a switching mechanism.
Figure 7:
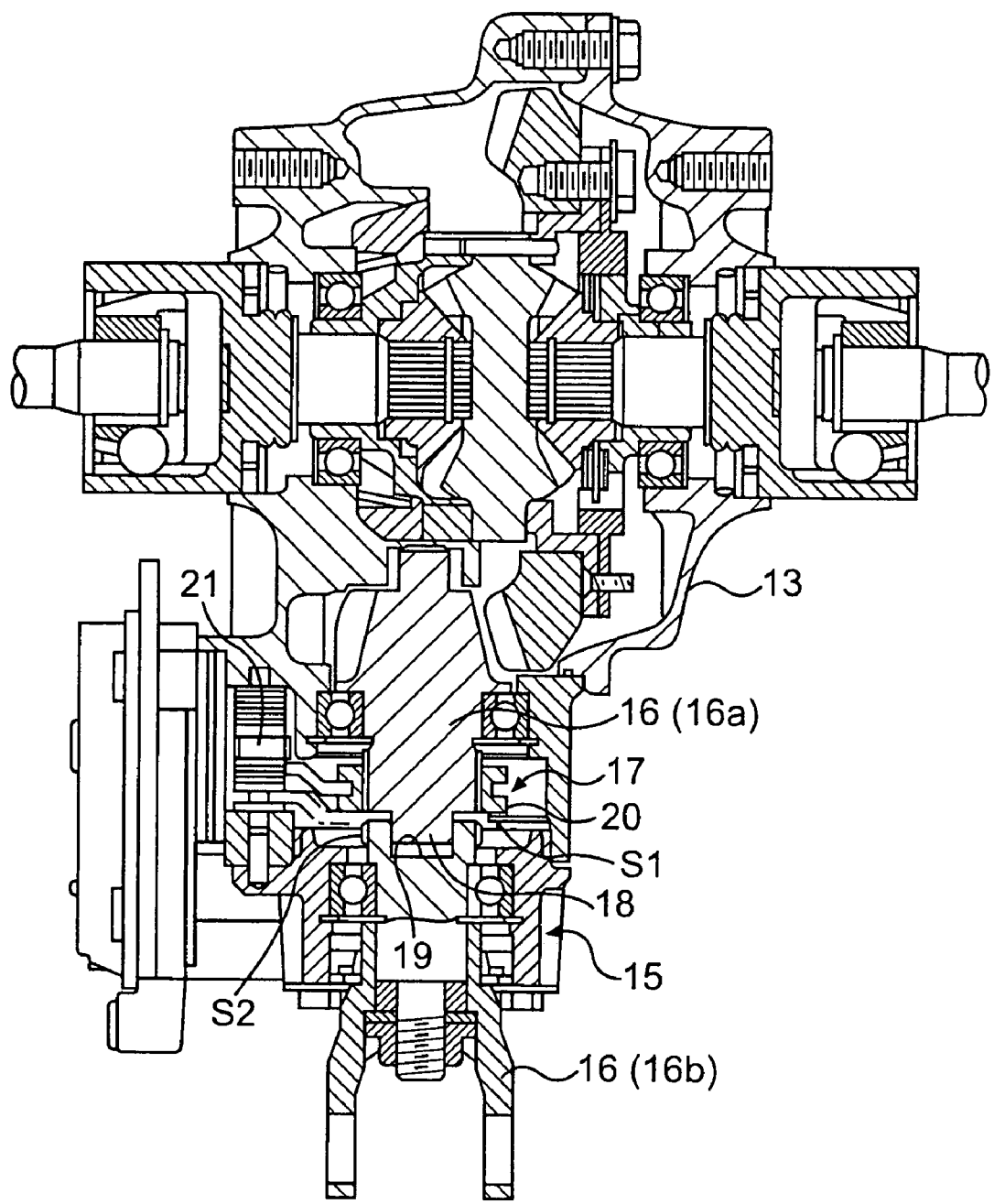
FIG. 7 is a sectional view showing the main part of one structural example of a conventional type two-wheel drive and four-wheel drive switching system.
Figure 8:
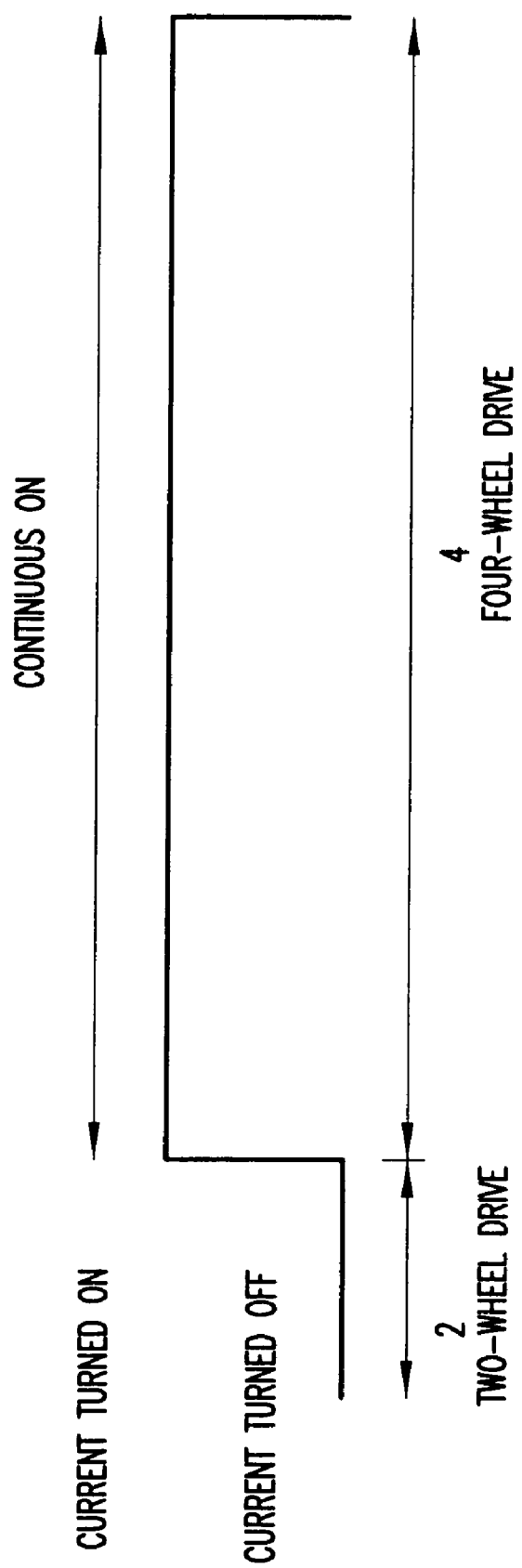
FIG. 8 shows a waveform of driving current supplied to the conventional type two-wheel drive and four-wheel drive switching system.

In this embodiment, the predetermined value Y is classified into a plurality of regions (V1 to V4 in this embodiment) according to the vehicle speed V as shown in FIGS. 6 and 7 and predetermined values Y1 to Y5 are set for every vehicle region V1 to V4.

The drive switching system 30 is equivalent to this embodiment and configured as described above disconnects the supply of current to the electromagnetic coil 49 to release the transmission of driving force to the front wheel 4 according to a signal of the two-wheel drive type output by the operation of the transfer switch 70 and releases the fixation of the retainer 45 and the outer ring 37 by the electromagnetic clutch 47.

In the meantime, the control unit 51 supplies driving current to the switching mechanism 35 in four-wheel drive by repeating continuous supply and supply by duty cycle control as shown in FIG. 6.

The ratio of the continuous supply time of driving current and supply time by duty cycle control is suitably set according to an operational state of an internal combustion engine 2 and a state of a load and is set in a range in which transition to two-wheel drive because of the shortage of clutch pressure is prevented.

Figure 3A:
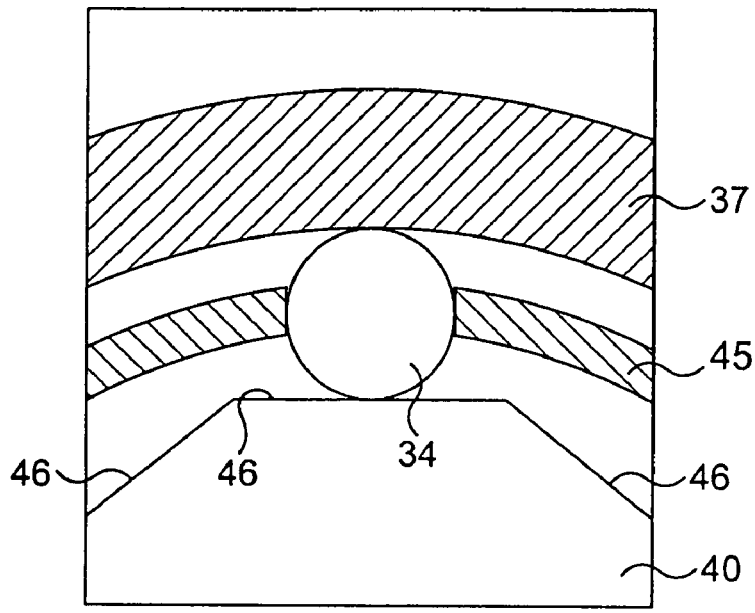
FIG. 3 is an enlarged sectional view showing the main part for explaining the operation of a drive switching system.

Hereby, as shown in FIG. 3A, the connecting/disconnecting member 34 is moved to the position of the bottom of the cam 46 and is held in a position apart from the outer ring 37.

As a result, the outer ring 37 and the inner ring 40 are disconnected, the turning of the driving shaft 32 is prevented from being transmitted to the driven shaft 33 and the drive of the front wheels 4 is stopped.

To realize four-wheel drive, the retainer 45 is fixed to the outer ring 37 by supplying current to the electromagnetic coil 49 and letting in the electromagnetic clutch 47 according to a signal for four-wheel drive output by the operation of the transfer switch 70.

Figure 3B:
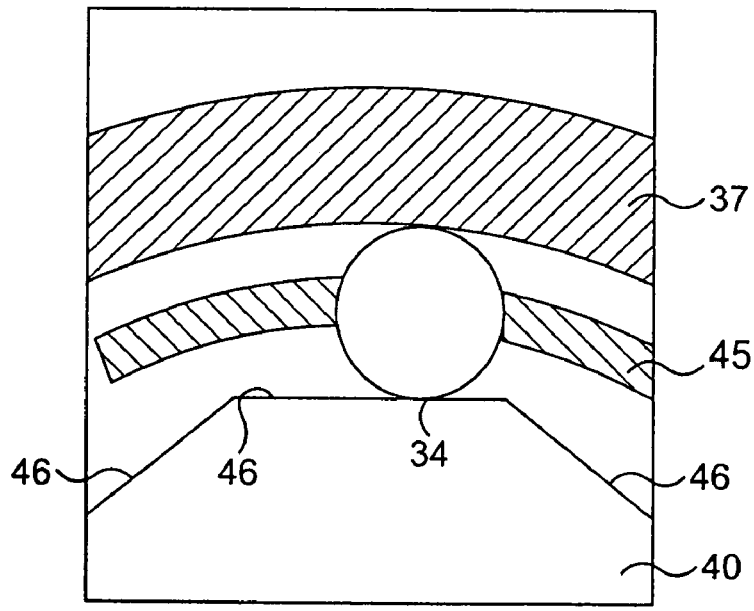

Hereby, the connecting/disconnecting member 34 held by the retainer 45 is moved together with the outer ring 37, as shown in FIG. 3B, is moved in the position of the top of the cam 46 formed on the inner ring 40 and is touched to the inner surface of the outer ring 37.

As a result, the outer ring 37 and the inner ring 40 are connected via the connecting/disconnecting member 34, hereby, the driving shaft 32 and the driven shaft 33 are connected, the turning of the driving shaft 32 is transmitted to the driven shaft 33 and the drive of the front wheels 4 is started.

In the drive switching system 30 equivalent to this embodiment and configured as described above, as the connecting/disconnecting member 34 is made a state in which power can be transmitted by being put between the outer ring 37 and the inner ring 40, impulsive sound is extremely small and as a result, the generation of noise in switching the types of drive can be inhibited.

As the switching unit 31 is united and can be mounted by fixing the switching unit 31 to the final reduction gear for the front wheels 13, it can be built without a large rearranging of existing structure.

The driving shaft 32 and the driven shaft 33 can be connected and disconnected even if there is a difference in peripheral speed between the front wheel 4 and the rear wheel 5, no complex auxiliary mechanism such as a synchronization mechanism is required to be provided and at this point, the configuration is also simplified.

As driving current supplied to the switching mechanism 35 is supplied by repeating continuous supply and supply by duty cycle control as described above in the case when the vehicle 1 is in a driving type of four-wheel drive, the power consumption is reduced, compared with a case having only a continuous supply and as a result, a generator and a battery can be miniaturized.

The form and the dimension of each component in the embodiment are an example and can be variously changed according to the requirement of design.

Figure 9:
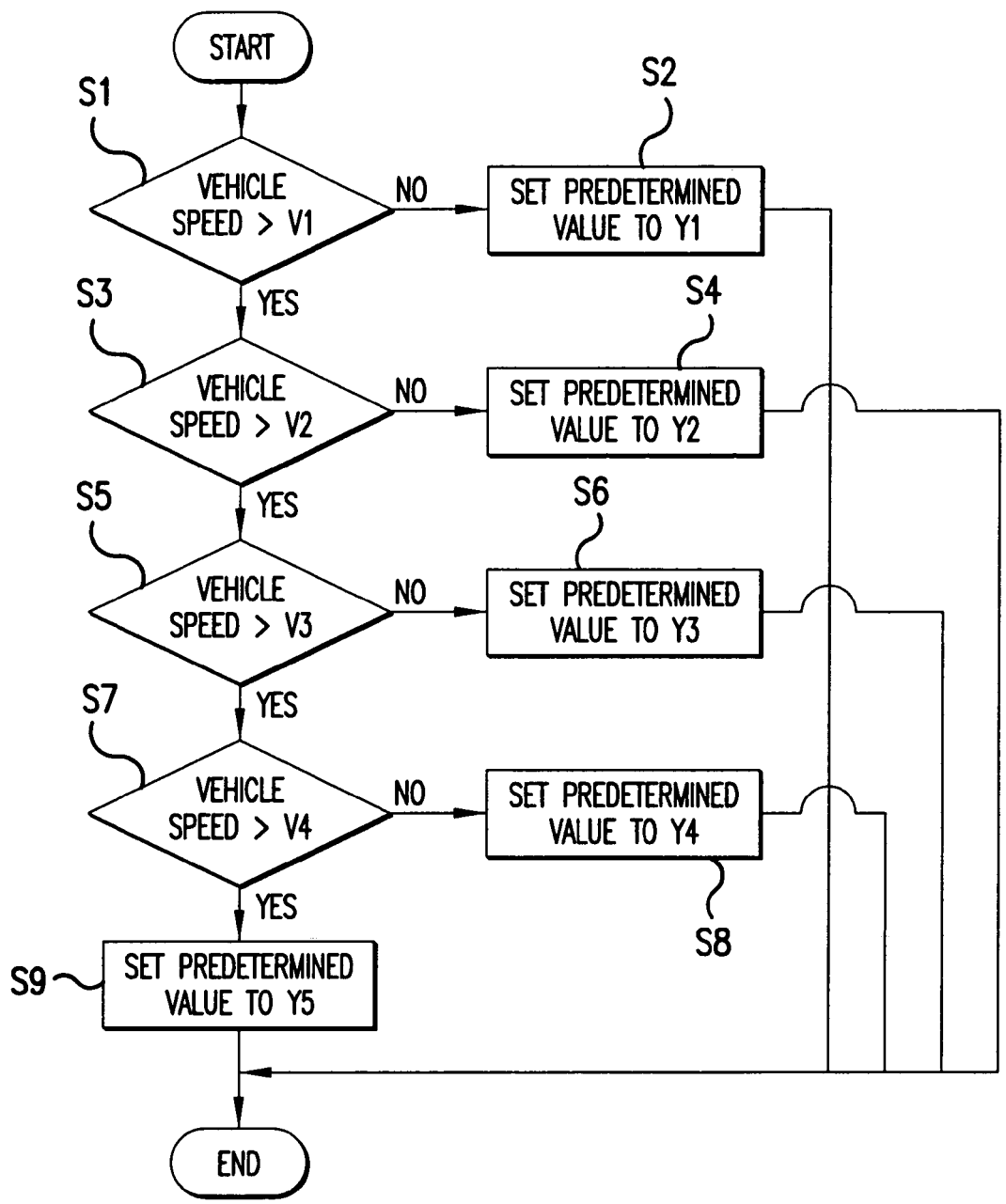
FIG. 9 is a control flowchart according to one embodiment of the invention.
Figure 10:
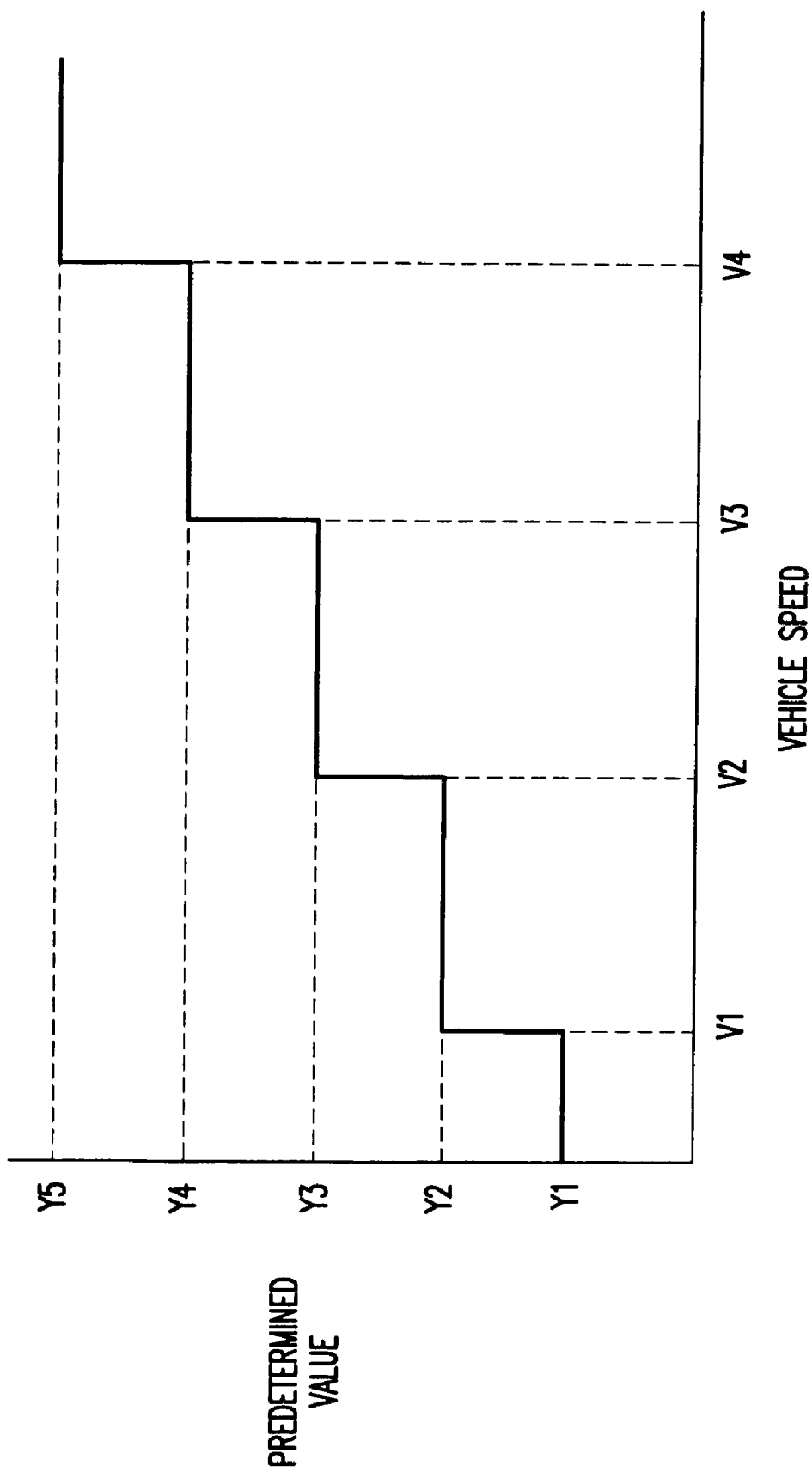
FIG. 10 is a graph showing the relationship between the switching timing for a four-wheel drive and vehicle speed in one embodiment of the invention.

Next, referring to FIGS. 9 and 10, a procedure for operation in switching to a four-wheel drive type will be described.

In driving the vehicle 1, in the control unit 51, the speed V of the vehicle 1 is always inputted and the rotational speed of the front wheel 4 and the rear wheel 5 is inputted.

When a rider operates the transfer switch 70 to switch to four-wheel drive and a switching signal is outputted to the control unit 51. It is determined in the control unit 51 whether vehicle speed V>V1 or not (step S1). In the case that it is determined that the vehicle speed V<V1, the predetermined value Y is set to Y1 (step S2) and in case the vehicle speed V>V1, control is shifted to the next step S3.

In the step S3, it is determined whether the vehicle speed V>V2 or not. In the case that it is determined that the vehicle speed V<V2, the predetermined value Y is set to Y2 (step S4) and in case it is determined that the vehicle speed V>V2, control is shifted to the next step S5.

In the step S5, it is determined whether the vehicle speed V>V3 or not, in case it is determined that the vehicle speed V<V3, the predetermined value Y is set to Y3 (step S6) and in case it is determined that the vehicle speed V>V3, control is shifted to the next step S7.

In the step S7, it is determined whether the vehicle speed V>V4 or not. In the case that it is determined that the vehicle speed V<V4, the predetermined value Y is set to Y4 (step S8) and in case it is determined that the vehicle speed V>V4, control is shifted to the next step S9 and the set value is set to Y5.

As described above, in this embodiment, when a rider switches the transfer switch 70 to the side of four-wheel drive to switch from two-wheel drive to four-wheel drive, two-wheel drive is held in a case that the difference in revolutions between the front wheel 4 and the rear wheel 5 is equal to or greater than the predetermined value Y and the two-wheel drive is switched to four-wheel drive when the difference in revolutions between the front wheel 4 and the rear wheel 5 is below the predetermined value Y.

Therefore, switching to four-wheel drive is made at a suitable timing in all vehicle speed regions and impact transmitted to a rider is minimized.

For example, in the embodiment, the vehicle speed V is classified into four regions, however, the number is arbitrary and the vehicle speed V may be also detected using the rotational speed of the front wheel 4 or the rear wheel 5 as a parameter.

Further, the description in the embodiment is based upon forward travel, however, switching to four-wheel drive in reverse may be also controlled by separately setting a predetermined value Y in reverse.

In reverse, switching to four-wheel drive when a transmission is shifted to a reverse position or when reverse is detected is also enabled.

As described above, according to the present invention, as the driving shaft and the driven shaft are connected or disconnected by the connecting/disconnecting member provided in a part in which the driving shaft and the driven shaft are fitted, they can be smoothly connected or disconnected even if there is difference in rotational speed between the shafts.

Therefore, no complex auxiliary mechanism such as a synchronization mechanism is required to be provided and the drive switching system according to the present invention can have simple structure.

Impulsive sound in connection and disconnection can be inhibited and as a result, the generation of noise in switching the types of drive can be inhibited.

As the switching unit can be mounted by uniting the switching unit and fixing it to the existing structure of the final reduction gear, it can be built without the large change of the existing structure.

Also, in the case where a vehicle is in a driving type of four-wheel drive, the power consumption can be reduced by supplying driving current supplied to the switching mechanism by repeating continuous supply and supply by duty cycle control, compared with the case having only continuous supply and as a result, the generator and the battery can be miniaturized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular two-wheel drive and four-wheel drive switching system, comprising:
    a switching unit provided on either side of power transmission mechanisms, respectively, provided between an engine and front wheels and between the engine and rear wheels for transmitting power in the power transmission mechanism or disconnecting the transmission of power;
    a driving shaft connected to a drive side;
    a driven shaft fitted to the driving shaft via an annular clearance gap, said driving shaft and said driven shaft being concentrically arranged relative to each other;
    a plurality of connecting/disconnecting members provided coaxially and extending a predetermined distance coaxially along the driven shaft in a clearance between the driving shaft and the driven shaft for connecting or disconnecting the driving shaft and the driven shaft by being fitted or disconnected to/from the respective opposite surfaces;
    a switching mechanism for selectively positioning the connecting/disconnecting members in a position in which the driving shaft and the driven shaft are connected and in a position in which they are disconnected; and
    a control unit for controlling the drive of the switching mechanism, said control unit supplies driving current to the switching mechanism by repeating continuous supply and supply by duty cycle control,
    wherein a reverse speed predetermined value is utilized when operating a vehicle in reverse.

2. The vehicular two-wheel drive and four-wheel drive switching system according to claim 1, wherein said connecting/disconnecting members include a plurality of rollers and a retainer wherein the retainer supports the rollers.

3. A vehicular two-wheel drive and four-wheel drive switching system, comprising:
    a switching unit provided on either side of power transmission mechanisms respectively provided between an engine and front wheels and between the engine and rear wheels for transmitting power in the power transmission mechanism or disconnecting the transmission of power;
    a driving shaft connected to a drive side;
    a driven shaft fitted to the driving shaft via an annular clearance gap, said driving shaft and said driven shaft being concentrically arranged relative to each other;
    a plurality of connecting/disconnecting members provided coaxially and extending a predetermined distance coaxially along the driven shaft in a clearance between the driving shaft and the driven shaft for connecting or disconnecting the driving shaft and the driven shaft by being fitted or disconnected to/from respective opposite surfaces;
    a switching mechanism for switching between a four-wheel drive for connecting the driving shaft and the driven shaft by operating the connecting/disconnecting members and a two-wheel drive for disconnecting the driving shaft and the driven shaft;
    a control unit for controlling the drive of the switching mechanism; and
    a manually operated transfer switch for inputting a signal for switching between the two-wheel drive and the four-wheel drive to the control unit; and
    when a signal for switching to the four-wheel drive is output from the transfer switch, the control unit holds the driving shaft and the driven shaft in a state wherein the driving shaft and the driven shaft are disconnected in a case where a difference in a rate of rotation between the front wheel and the rear wheel is equal to or greater than a vehicle speed of a preset plurality of predetermined values and switches to a state in which the driving shaft and the driven shaft are connected in a case where a difference in the rate of rotation between the front wheel and the rear wheel is below a vehicle speed of the preset plurality of predetermined values,
    wherein the vehicle speed is classified into a plurality of regions and the predetermined value is set for every region of vehicle speed,
    wherein a reverse speed predetermined value is utilized when operating a vehicle in reverse.

4. The vehicular two-wheel drive and four-wheel drive switching system according to claim 3, wherein the vehicle speed is detected using the rotational speed of the front wheel or the rear wheel as a parameter.

5. The vehicular two-wheel drive and four-wheel drive switching system according to claim 3, wherein said connecting/disconnecting members include a plurality of rollers and a retainer wherein the retainer supports the rollers.

6. A vehicular two-wheel drive and four-wheel drive switching system, comprising:
- a driving shaft connected to a drive side;
- a driven shaft fitted to the driving shaft via a switching ring with an annular clearance gap provided therebetween, said driving shaft and said driven shaft being concentrically arranged relative to each other;
- a plurality of connecting/disconnecting members provided coaxially and extending a predetermined distance coaxially along the driven shaft in the clearance gap between the driving shaft and the driven shaft for connecting or disconnecting the driving shaft and the driven shaft by being fitted or disconnected to/from respective opposite surfaces;
- a switching mechanism for switching between a four-wheel drive for connecting the driving shaft and the driven shaft by operating the connecting/disconnecting members and a two-wheel drive for disconnecting the driving shaft and the driven shaft;
- a control unit for controlling the drive of the switching mechanism; and
- a manually operated transfer switch for inputting a signal for switching between the two-wheel drive and the four-wheel drive to the control unit; and when a signal for switching to the four-wheel drive is output from the transfer switch, the control unit holds the driving shaft and the driven shaft in a state wherein the driving shaft and the driven shaft are disconnected in a case where a difference in a rate of rotation between the front wheel and the rear wheel is equal to or greater than a vehicle speed of a preset plurality of predetermined values and switches to a state in which the driving shaft and the driven shaft are connected in a case where a difference in the rate of rotation between the front wheel and the rear wheel is below a vehicle speed of the preset plurality of predetermined values,
- wherein a reverse speed predetermined value is utilized when operating a vehicle in reverse.

7. The vehicular two-wheel drive and four-wheel drive switching system according to claim 6, wherein the vehicle speed is classified into a plurality of regions and the predetermined value is set for every region of vehicle speed.

8. The vehicular two-wheel drive and four-wheel drive switching system according to claim 6, wherein the vehicle speed is detected using the rotational speed of the front wheel or the rear wheel as a parameter.

9. The vehicular two-wheel drive and four-wheel drive switching system according to claim 7, wherein the vehicle speed is detected using the rotational speed of the front wheel or the rear wheel as a parameter.

10. The vehicular two-wheel drive and four-wheel drive switching system according to claim 6, wherein said connecting/disconnecting members include a plurality of rollers and a retainer wherein the retainer supports the rollers.

* * * * *